United States Patent [19]

McNeill

[11] Patent Number: 5,656,992

[45] Date of Patent: Aug. 12, 1997

[54] EXTERNALLY MOUNTED VEHICLE SPEEDOMETER DISPLAY

[76] Inventor: Sheila Ann McNeill, P.O. Box 200, Bronx, N.Y. 10455-0200

[21] Appl. No.: 620,975

[22] Filed: Mar. 25, 1996

[51] Int. Cl.$^6$ ...................................................... B60Q 1/00
[52] U.S. Cl. .................... 340/441; 340/463; 340/464; 340/466; 364/426.041
[58] Field of Search .......................... 340/441, 462, 340/463, 466, 468, 905, 936, 461, 464; 364/426.04, 424.06

[56] References Cited

U.S. PATENT DOCUMENTS

| | | | |
|---|---|---|---|
| 3,550,076 | 12/1970 | Kent | 340/466 |
| 3,774,152 | 11/1973 | Tandy | 340/466 |
| 4,162,445 | 7/1979 | Campbell | 324/175 |
| 4,368,427 | 1/1983 | Hayashi et al. | 324/161 |
| 4,635,034 | 1/1987 | Tokuyama et al. | 340/441 |
| 4,894,641 | 1/1990 | Yang | 340/464 |
| 5,003,257 | 3/1991 | Okura et al. | 324/166 |
| 5,132,666 | 7/1992 | Fahs | 340/468 |
| 5,153,559 | 10/1992 | Atsumi | 340/435 |
| 5,165,497 | 11/1992 | Chi | 180/169 |
| 5,325,302 | 6/1994 | Izidon et al. | 364/461 |
| 5,388,048 | 2/1995 | Yavnayi et al. | 364/461 |
| 5,486,808 | 1/1996 | Nejdl | 340/463 |

*Primary Examiner*—Jeffery Hofsass
*Assistant Examiner*—Davetta Woods
*Attorney, Agent, or Firm*—John D. Gugliotta; David L. Volk

[57] ABSTRACT

An externally mounted vehicle speedometer display is disclosed comprising an external speedometer intended to be installed on the outer rear segment of a motor vehicle. Housing a green digital speedometer, a magnifying lens is provided to increase visibility to surrounding drivers. Designed to be wired to either new or existing vehicles, a memory chip is provided for storing and retaining speed history information for the vehicle over a limited time period, in order to provide speed information in case of an accident.

15 Claims, 2 Drawing Sheets

5,656,992

1

EXTERNALLY MOUNTED VEHICLE SPEEDOMETER DISPLAY

BACKGROUND OF THE INVENTION

1. Field of the Invention

The present invention relates generally to lighted safety displays and, more particularly, to a lighted speedometer display externally mountable on an automobile in order to warn surrounding traffic of potentially dangerous situations which may result from a combination of excessive or minimal speed plus adverse driving conditions.

2. Description of the Related Art

In the related art, many vehicle anti-collision devices are known. For example, in U.S. Pat. No. 5,388,048, issued in the name of Yavnayi et al., a vehicle anti-collision device is disclosed utilizing a laser range finder to calculate the closing distance between two automobiles.

And again, in U.S. Pat. No. 5,325,302, issued in the name of Izidon et al., a GPS-Based Anti-Collision Warning System is disclosed for use in avoiding collisions between ships or between aircraft.

Also, in U.S. Pat. No. 5,165,497, issued in the name of Chi, an automatic safety driving distance control device for a vehicle is disclosed which can automatically control the speed of a user's vehicle to aid in avoiding a collision with a preceding vehicle.

Finally, in U.S. Pat. No. 5,153,559, issued in the name of Atsumi, equipment for detecting the movement of a preceding vehicle and giving warning is disclosed utilizing distance measuring sensors, brake detection sensors, and a computerized speed comparator.

Another problem occurs from the use of speedometers utilizing analog displays. Determining speed from an analog display can cause problems with visibility and accuracy, both of which have been addressed by the use of digital indication type speedometers. An example of such a speedometer is disclosed in U.S. Pat. No. 4,368,427, issued in the name of Hayashi et al.

Numerous attempts have been made to provide a system of warning for or preventing eminent collisions, none have been able to provide a simple, easy, and accurate way of warning surrounding vehicles of protection speed related hazards before such hazards occur. Consequently, a need has been felt for providing an apparatus and method which can capture the attention of drivers and alter them as to the excessively slow or fast speed of a vehicle.

SUMMARY OF THE INVENTION

It is therefore an object of the present invention to provide an improved vehicle anti-collision device.

It is another object of the present invention to provide a device which can capture the attention of surrounding drivers and alter them to the excessively slow or fast speed of a vehicle.

It is another object of the present invention to provide a device which can record and store the speed at which a vehicle was traveling in order to provide information in the case of an accident.

It is a feature of the present invention to provide an improved vehicle speedometer display which can be externally mounted to a vehicle in order to provide speed information to trailing and surrounding vehicles.

Briefly described according to one embodiment of the present invention, an externally mounted vehicle speedometer display is disclosed comprising an external speedometer intended to be installed on the outer rear segment of a motor vehicle. Housing a green digital speedometer, a magnifying lens is provided to increase visibility to surrounding drivers. Designed to be wired to either new or existing vehicles, a memory chip is provided for storing and retaining speed history information for the vehicle over a limited time period, in order to provide speed information in case of an accident.

An advantage of the present invention is that it will capture the attention of surrounding drivers, altering them as to excessively slow or fast speeds which may pose a potential hazard.

Another advantage of the present invention is that the device will make drivers more aware of the speed at which they are traveling, thereby possibly reducing the risk of an accident.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

1. Detailed Description of the Figures

Figure 1:
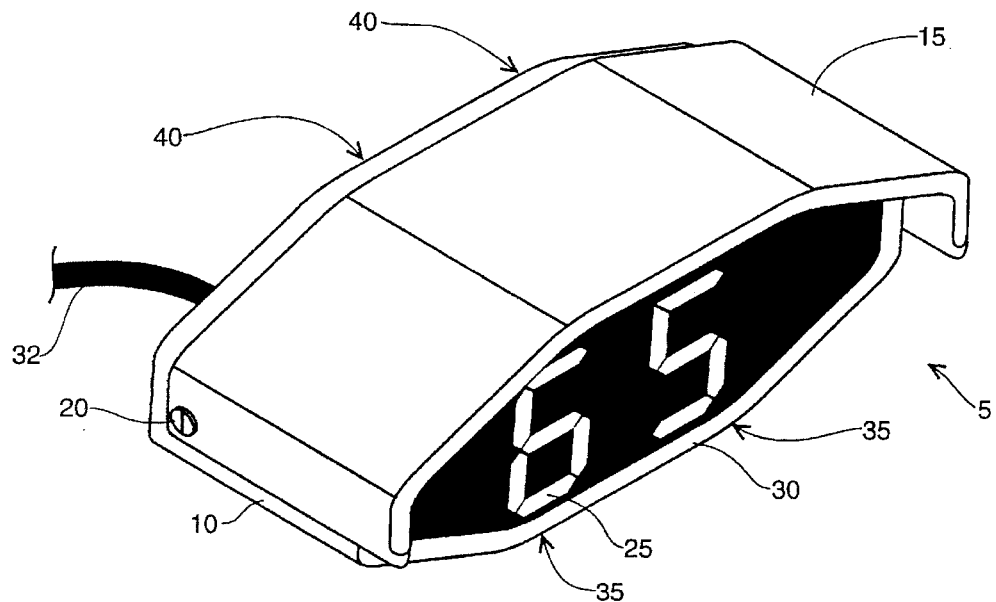
FIG. 1 is a perspective view of an externally mounted vehicle speedometer display, according to preferred embodiment of the present invention.

Referring now to FIG. 1, an externally mounted vehicle speedometer display 5 is shown according to the preferred embodiment to the present invention. An outer housing 10, preferably made of plastic or other equally physically strong material, is provided that houses and protects the major components of the externally mounted vehicle speedometer display 5 which will be described later. A glare prevention cover 15 is secured to the outer housing 10 via a first fastening means 20 such as screws. The glare prevention cover 15 functions to improve visibility by eliminating the overhead impact of light such as from the sun or from overhead street lights. In addition the glare prevention cover 15 also provides protection from the elements such as rain or snow. A digital readout 25 is provided to display the vehicle's current speed. This figure, as well as others, depict the speed in a miles per hour format, though other formats such as kilometers per hour could equally as easily be used. Providing a protective covering for the digital readout 25 is a magnifying lens 30. The magnifying lens 30 also forms the front cover for the outer housing 10 and provides a means to magnify the image size of the digital readout 25 in a fashion which allows other motorists to see the externally mounted vehicle speedometer display 5 at a greater distance. Protruding from the rear of the outer housing 10 is a wiring harness 32, whose function will be described in detail below. A second attachment means 35 is affixed to the bottom of said outer housing 10 for firmly securing the externally mounted vehicle speedometer display 5 to a motor vehicle upon a horizontal surface such as a trunk lid. A third attachment means 40 is affixed to the rear of said outer housing 10 for firmly securing the externally mounted vehicle speedometer display 5 to a motor vehicle upon a vertical surface such as a rear tailgate. However, it can easily be seen, by those familiar in the art, that both the second attachment means 35 and the third attachment means 40 could be replaced by a strong permanent magnet (not shown) to be utilized by those individuals not willing to permanently fasten to the externally mounted vehicle speedometer display 5 to a motor vehicle.

Figure 2:
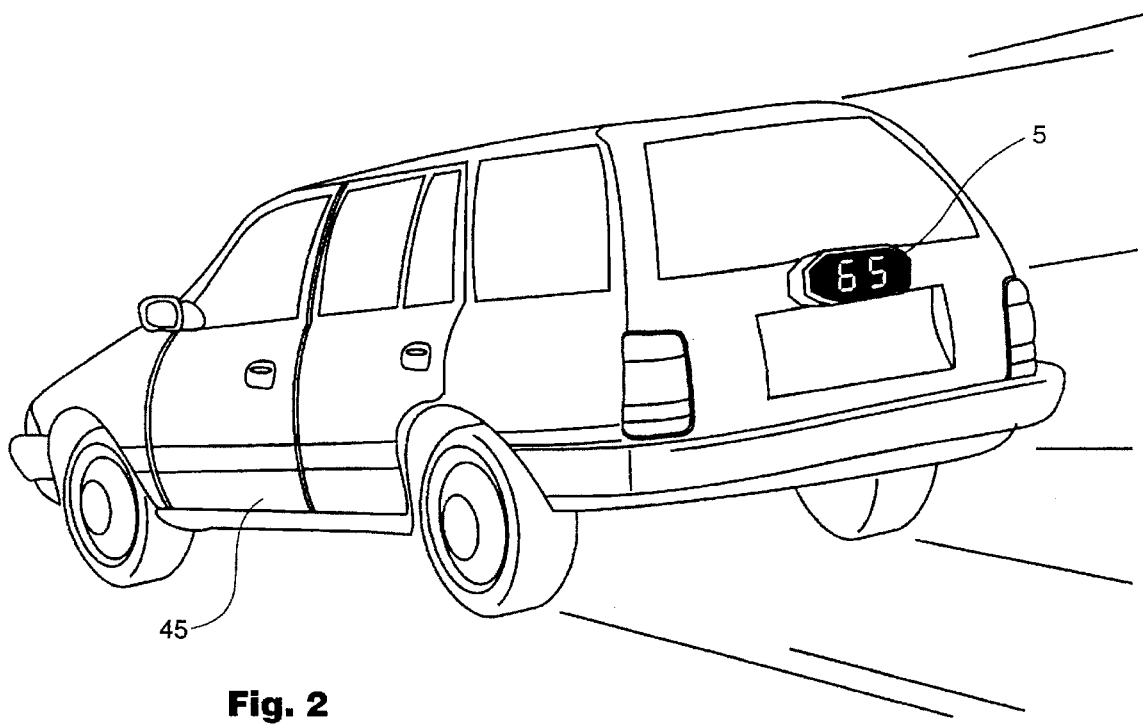
FIG. 2 is perspective view of the present invention when used in conjunction with an automobile.

Referring next to FIG. 2, the externally mounted vehicle speedometer display 5 is shown being utilized on a typical motor vehicle 45. The installation depicted here would favor the use of a third attachment means 40 (not shown) for installing the externally mounted vehicle speedometer display 5.

Figure 3:
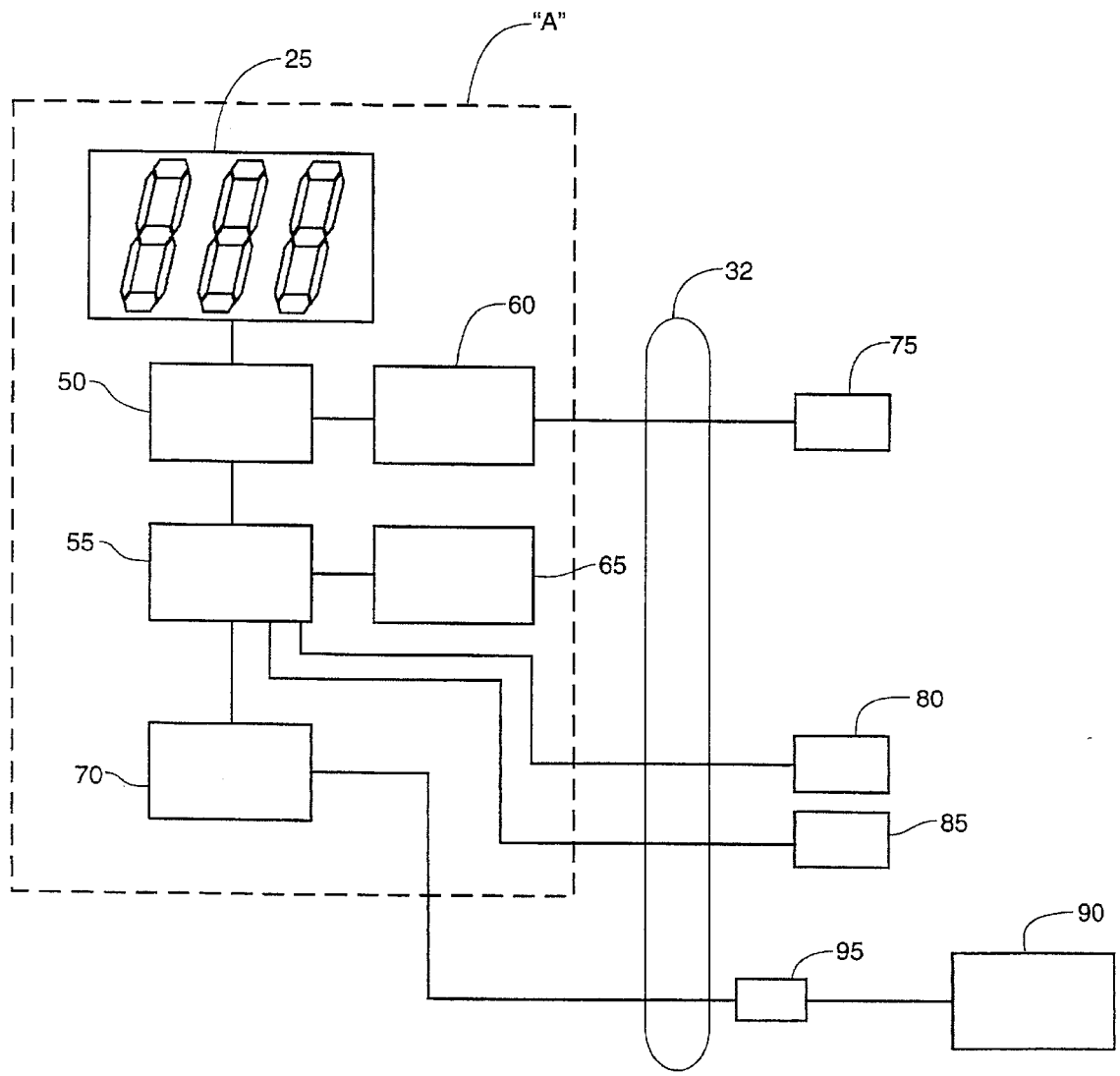
FIG. 3 is a functional block diagram depicting the major electrical components of the present invention.

Referring finally to FIG. 3 the major electrical components of the externally mounted vehicle speedometer display 5 are disclosed in a functional block diagram. The outer housing 10 (not shown) is depicted by the dashed line box "A". Contained within the outer housing 10 (not shown) is the digital readout 25 and an electronic display driver circuit 50 for converting electrical impulses into data which can be utilized by the digital readout 25 for displaying speed. A microprocessor 55 is provided which takes electrical data from a pulse counter 60 and integrates the data over time to obtain vehicle speed information. A nonvolatile memory circuit 65 is provided which is used to store vehicle speed data for a fixed length of vehicle operational time. It is anticipated that this stored speed data could be utilized by law enforcement authorities in the event of a motor vehicle accident or motor vehicle violation. Finally located within the outer housing 10 (not shown) is a power supply 70 which provides electrical power to the above devices within the outer housing 10 via conductors in the wiring harness 32. Additional conductors within the wiring harness 32 provide an electrical signal path to a speed pickup sensing means 75. It is envisioned that the speed pickup sensing means 75 could take many configurations, one of which would be a revolution sensor on the vehicle drive shaft. Another set of conductors within the wiring harness 32 provide an electrical signal path for a brake activated switch 80. The brake activated switch 80 would activate the digital readout 25 upon the externally mounted vehicle speedometer display 5 whenever the brake pedal was activated. This function would serve to alert fellow motorists that said vehicle was decelerating. Another set of conductors within the wiring harness 32 provide an electrical signal path for an on/off switch with indicating means 85. The on/off switch with indicating means 85 would be activated by the driver of said vehicle under certain conditions such as poor visibility, inclement weather, tailgating by other motorists and the like. The indicating means on the on/off switch with indicating means 85, such as a light, would serve to remind the driver that the externally mounted vehicle speedometer display 5 is in an activated state. A final set of conductors within the wiring harness 32 would provide power to the externally mounted vehicle speedometer display 5 from a vehicle power system 90 via an over current protective means 95 such as a fuse.

It is anticipated that the externally mounted vehicle speedometer display 5 would be available as a factory option on a motor vehicle though its simple design and ease of connection would allow for it to be available as an aftermarket item for all motor vehicles including but not limited to cars, vans, trucks, busses, and motorcycles.

2. Operation of the Preferred Embodiment

In operation, the present invention can be utilized by the common user in a simple, transparent and effortless manner.

To use the present invention with its preferred embodiment can best be described in conjunction with the perspective views of FIGS. 1–2 and the functional block diagram depicting the major electrical components of FIG. 3.

A user would first utilize the functions of the externally mounted vehicle speedometer display 5 while operating a typical motor vehicle 45. In the event of poor visibility, inclement weather, tailgating by other motorists and the like, the operator of said vehicle could activate the externally mounted vehicle speedometer display 5 by using the on/off switch with indicating means 85, typical mounted on said vehicle's dash. Whenever the user would depress the brake pedal of the said vehicle, the digital readout 25 of the externally mounted vehicle speedometer display 5 would intensify slightly together with the brake lights, thereby displaying the said vehicle's speed in a manner for all nearby motorists to see.

Additionally, the nonvolatile memory circuit 65 of the externally mounted vehicle speedometer display 5 would provide valuable data to law enforcement authorities in the event of a motor vehicle accident or motor vehicle violation. It is envisioned that when driving a vehicle, the speed of the vehicle will be displayed when unit is in the "on" mode; should a collision occur, the data will be recorded for insurance purposes. Additionally, it is envisioned that audible messaging will be available to provide the following audible messages, as examples, depending upon the condition: "'Exo-Speedometer' on"; "'Exo-Speedometer' off"; "Impact! Recording data"; "Impact! Recording complete"; etc.

The foregoing description is included to illustrate the operation of the preferred embodiment and is not meant to limit the scope of the invention. The scope of the invention is to be limited only by the following claims.

What is claimed is:

1. An externally mounted vehicle speedometer display comprising:

an outer housing for housing and protecting the major components of the externally mounted vehicle speedometer display;

a digital display for displaying a vehicle's current speed;

a magnifying lens forms a front cover for the outer housing, said magnifying lens providing a means to magnify the image size of the digital readout in a fashion which allows other motorists to see the externally mounted vehicle speedometer display at a greater distance;

a glare prevention cover secured to the outer housing via a first fastening means, said glare prevention cover for improving visibility by eliminating the overhead impact of light such as from the sun or from overhead street lights;

a wiring harness protruding from the rear of said outer housing, said wiring harness in electrical communication with said digital readout for both powering said digital readout and providing information concerning vehicle speed to said digital readout;

a second attachment means affixed to the bottom of said outer housing for firmly securing the externally mounted vehicle speedometer display to a motor vehicle upon a horizontal surface;

a third attachment means affixed to the rear of said outer housing for firmly securing the externally mounted vehicle speedometer display to a motor vehicle upon a vertical surface; and a brake activated switch in communication with both said digital display and a vehicle brake pedal, said brake activation switch for intensifying said digital display whenever said brake pedal is depressed, thereby alerting motorists of sudden vehicle deceleration.

2. The externally mounted vehicle speedometer display as described in claim 1, wherein said outer housing is made of a rigid plastic material.

3. The externally mounted vehicle speedometer display as described in claim 1, wherein said second attachment means comprises a strong permanent magnet.

4. The externally mounted vehicle speedometer display as described in claim 1, wherein said third attachment means comprises a strong permanent magnet.

5. The externally mounted vehicle speedometer display as described in claim 1, wherein said digital display comprises:
   a digital readout for displaying speed;
   an electronic display driver circuit 50 for converting electrical impulses into data which can be utilized by the digital readout for displaying speed.

6. The externally mounted vehicle speedometer display as described in claim 5, wherein said electronic display driver circuit comprises:
   a speed pickup sensing means for sensing the speed of a vehicle;
   a pulse counter in communication with said speed pickup sensing means, said pulse counter for producing an electrical pulse in proportion to vehicle speed;
   a microprocessor for receiving electrical data from said pulse counter and for integrating said data over time to obtain vehicle speed information;
   a nonvolatile memory circuit for storing said vehicle speed information data for a fixed length of vehicle operational time; and
   a power supply for providing electrical power to said display driver circuit components.

7. The externally mounted vehicle speedometer display as described in claim 1, further comprising:
   an on/off switch for selectively activating and deactivating said digital display means, said on/off switch in electrical communication with said power supply; and
   indicating means in connection with said on/off switch for indicating either on or off status of said on/off switch.

8. In a vehicle speedometer display having a digital display for displaying a vehicle's current speed, the improvement comprising an outer housing for externally mounting said vehicle speedometer display and for housing and protecting the major components of the externally mounted vehicle speedometer display, and a brake activated switch in communication with both said digital display and said brake pedal, said brake activation switch for intensifying said digital display whenever said brake pedal is depressed, thereby alerting motorists of sudden vehicle deceleration.

9. In the vehicle speedometer display as described in claim 8, wherein the improvement further comprises:
   a magnifying lens forms a front cover for the outer housing, said magnifying lens providing a means to magnify the image size of the digital readout in a fashion which allows other motorists to see the externally mounted vehicle speedometer display at a greater distance;
   a glare prevention cover secured to the outer housing via a first fastening means, said glare prevention cover for improving visibility by eliminating the overhead impact of light such as from the sun or from overhead street lights;
   a wiring harness protruding from the rear of said outer housing, said wiring harness in electrical communication with said digital readout for both powering said digital readout and providing information concerning vehicle speed to said digital readout;
   a second attachment means affixed to the bottom of said outer housing for firmly securing the externally mounted vehicle speedometer display to a motor vehicle upon a horizontal surface; and
   a third attachment means affixed to the rear of said outer housing for firmly securing the externally mounted vehicle speedometer display to a motor vehicle upon a vertical surface.

10. In the vehicle speedometer display as described in claim 8, wherein the improvement further comprises said second attachment means comprising a strong permanent magnet.

11. In the vehicle speedometer display as described in claim 8, wherein the improvement further comprises said third attachment means comprising a strong permanent magnet.

12. The externally mounted vehicle speedometer display as described in claim 8, wherein said digital display comprises:
   a digital readout for displaying speed;
   an electronic display driver circuit 50 for converting electrical impulses into data which can be utilized by the digital readout for displaying speed.

13. The externally mounted vehicle speedometer display as described in claim 12, wherein said electronic display driver circuit comprises:
   a speed pickup sensing means for sensing the speed of a vehicle;
   a pulse counter in communication with said speed pickup sensing means, said pulse counter for producing an electrical pulse in proportion to vehicle speed;
   a microprocessor for receiving electrical data from said pulse counter and for integrating said data over time to obtain vehicle speed information;
   a nonvolatile memory circuit for storing said vehicle speed information data for a fixed length of vehicle operational time; and
   a power supply for providing electrical power to said display driver circuit components.

14. In the vehicle speedometer display as described in claim 8, the improvement further comprising:
   an on/off switch for selectively activating and deactivating said digital display means, said on/off switch in electrical communication with said power supply; and
   indicating means in connection with said on/off switch for indicating either on or off status of said on/off switch.

15. An externally mounted vehicle speedometer display comprising:
   an outer housing for housing and protecting the major components of the externally mounted vehicle speedometer display;
   a digital display for displaying a vehicle's current speed;
   a magnifying lens forms a front cover for the outer housing, said magnifying lens providing a means to magnify the image size of the digital readout in a fashion which allows other motorists to see the externally mounted vehicle speedometer display at a greater distance;
   a glare prevention cover secured to the outer housing via a first fastening means, said glare prevention cover for improving visibility by eliminating the overhead impact of light such as from the sun or from overhead street lights;

a wiring harness protruding from the rear of said outer housing, said wiring harness in electrical communication with said digital readout for both powering said digital readout and providing information concerning vehicle speed to said digital readout;

a second attachment means affixed to the bottom of said outer housing for firmly securing the externally mounted vehicle speedometer display to a motor vehicle upon a horizontal surface;

a third attachment means affixed to the rear of said outer housing for firmly securing the externally mounted vehicle speedometer display to a motor vehicle upon a vertical surface; and a brake responsive means for intensifying said digital display whenever a brake pedal is depressed, thereby alerting motorists of sudden vehicle deceleration.

* * * * *